(12) United States Patent
Bachl et al.

(10) Patent No.: US 7,940,721 B2
(45) Date of Patent: May 10, 2011

(54) POWER OVERLOAD CONTROL METHOD USEFUL WITH ENHANCED DEDICATED CHANNEL TRAFFIC

(75) Inventors: Rainer Walter Bachl, Bavaria (DE); Jens Mueckenheim, Bavaria (DE); Enrico Jugl, Bavaria (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 955 days.

(21) Appl. No.: 11/615,026

(22) Filed: Dec. 22, 2006

(65) Prior Publication Data

US 2008/0151819 A1    Jun. 26, 2008

(51) Int. Cl.
    *H04W 4/00*    (2009.01)
(52) U.S. Cl. .................................. 370/329; 370/338
(58) Field of Classification Search .............. 370/329, 370/335, 252, 331, 350, 338; 455/450, 442, 455/63, 509, 226
    See application file for complete search history.

(56) References Cited

U.S. PATENT DOCUMENTS

| | | | |
|---|---|---|---|
| 2004/0198369 A1* | 10/2004 | Kwak et al. | 455/452.2 |
| 2004/0219920 A1* | 11/2004 | Love et al. | 455/442 |
| 2005/0169293 A1* | 8/2005 | Zhang et al. | 370/437 |
| 2005/0207359 A1* | 9/2005 | Hwang et al. | 370/278 |
| 2005/0255873 A1* | 11/2005 | Zhang et al. | 455/522 |
| 2005/0281219 A1* | 12/2005 | Kim et al. | 370/328 |
| 2006/0062146 A1* | 3/2006 | Sebire et al. | 370/230 |
| 2006/0215608 A1* | 9/2006 | Lee et al. | 370/331 |
| 2006/0234638 A1* | 10/2006 | Mueckenheim et al. | 455/67.11 |
| 2007/0281708 A1* | 12/2007 | Bakhuizen et al. | 455/450 |
| 2008/0056182 A1* | 3/2008 | Usuda et al. | 370/329 |
| 2008/0214197 A1* | 9/2008 | Englund et al. | 455/450 |
| 2009/0054071 A1* | 2/2009 | Mustapha | 455/450 |

FOREIGN PATENT DOCUMENTS

WO    2006077141 A1    7/2006

OTHER PUBLICATIONS

U.S. Appl. No. 11/614,140, filed Dec. 21, 2006, entitled "Power Overload Control Method Useful With High Speed Downlink Packet Access".
3GPP TS 25.309, V6.6.0 (Mar. 2006), 3rd Generation Partnership Project; Technical Specification Group Radio Access Network; FDD Enhanced Uplink: Overall description; Stage 2 (Release 6).
Tdoc R1-061344, 3GPP TSG RAN WG1 Meeting #45, Shanghai, China, May 8-12, 2006; Change Request 25.215 CR 0170 rev—7.0. 0; "Introduction of a Node B measurement for E-DCH RRM".

(Continued)

*Primary Examiner* — Ajit Patel
*Assistant Examiner* — Mahendra Patel
(74) *Attorney, Agent, or Firm* — Carlson, Gaskey & Olds, PC

(57) ABSTRACT

An exemplary method of controlling communications that may include enhanced dedicated channel (E-DCH) traffic includes setting a total uplink power limit below an allowable power limit. A minimum amount of uplink resources is allocated to each user requesting E-DCH service on an individual user basis such that a cumulative E-DCH power allocation satisfies a selected minimum E-DCH power allocation threshold. A determination whether to grant a non-E-DCH service request is made based upon a relationship between the current total uplink power and the total uplink power limit and a relationship between the selected minimum E-DCH power allocation threshold and a current cumulative E-DCH power.

14 Claims, 2 Drawing Sheets

OTHER PUBLICATIONS

Tdoc R1-011447, 3GPP TSG-RAN WG1 #45, Shanghai, China, May 8-12, 2006, 5.6, Maintenance of R99, Re14, Re15, Re16, Re17; Other, "Measurement in support of EDCH scheduling".

NOKIA: "E-TFC Limitation for UE" 3GPP TSG-RAN WG2 Meeting #45bis; Jan. 10, 2005-Jan. 14, 2005; XP-002370694.

NOKIA: "Resource Allocation Method for E-DCH" 3GPP TSG RAN WG3#44 Meeting; Oct. 4, 2004-Oct. 8, 2004; XP-002486480.

VODAFONE: "UL load measurement requirements for E-DCH" TSG-RAN Working Group 3 #44; Oct. 4, 2004-Oct. 8, 2004; XP-002486481.

International Search Report and Written Opinion of the International Searching Authority for International application No. PCT/US2007/025545 mailed Jul. 21, 2008.

* cited by examiner

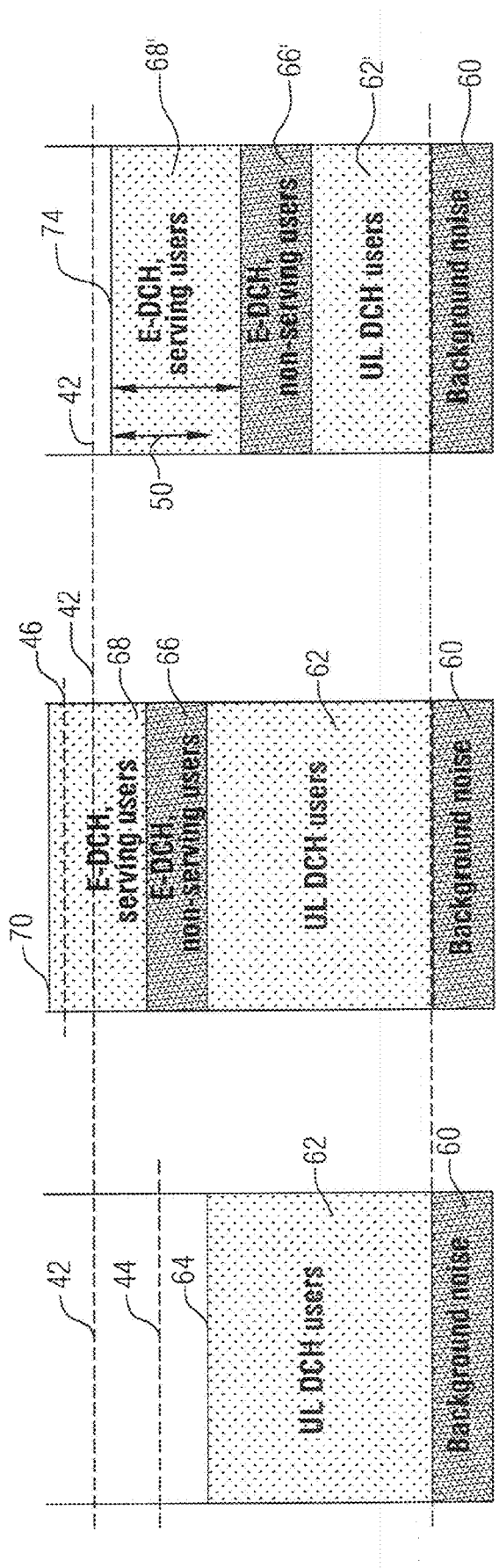

POWER OVERLOAD CONTROL METHOD USEFUL WITH ENHANCED DEDICATED CHANNEL TRAFFIC

TECHNICAL FIELD

This invention generally relates to communication. More particularly, this invention relates to wireless communications.

DESCRIPTION OF THE RELATED ART

Wireless communication systems have been used for a variety of purposes. Voice communications have been available for quite some time. More recently, wireless data communications have become popular. With the increased use of such communications, providers have strived to increase data communication possibilities for subscribers.

One example feature is Enhanced Dedicated Channel (E-DCH), which is considered synonymous with High-Speed Uplink Packet Access (HSUPA) in this document. E-DCH is a Release 6 feature in the 3GPP UMTS standard. It is intended to improve coverage and user-perceived throughput and to reduce the data transfer delay compared to the R99 DCH. The physical channel is similar to R99 DCH. Turbo coding and code multiplexing up to two channelization codes of spreading factor 2 plus two channelization codes of spreading factor 4 are supported, which provide a theoretical maximum data rate of up to 5.7 Mbit/s at the physical layer.

One of the changes with regard to radio resource management for E-DCH compared with previous transmission methods over DCH is the transition of more responsibility for E-DCH resource management from the radio network controller (RNC) to the NodeB and the user equipment (UE). The main part of the E-DCH resource management is the E-DCH scheduling, which is distributed between the UE and NodeB. The UEs indicate resource requests by sending scheduling information reports to the NodeB. Then the NodeB scheduler uses a known scheduling algorithm and assigns the uplink resources to the different UEs by sending scheduling grants providing a maximum amount of uplink resources that the UE can use for the uplink transmission. Fast E-DCH scheduling allows a tighter control of the uplink resources, which allows larger setting of the uplink resource limits, hence increasing user-perceived and aggregated cell throughput for E-DCH.

The main resource to be managed in uplink is the uplink total interference, represented by the received total wideband power (RTWP) measurement, which is measured in dBm. RTWP is caused by different traffic portions when E-DCH is active in a cell. One portion comprises background noise including all interference that is not generated by the UMTS system. For example, thermal noise, man-made noise or interference generated from other mobile systems, fall under this category. The relevant portion of the interference to be controlled by UMTS is above the background noise. Another portion of RTWP is not controlled by the E-DCH scheduler. The major sources of this portion are DCH users, which use circuit switched voice service or do not support E-DCH, common channels such as RACH, uplink control channels such as HS-DPCCH, and non scheduled E-DCH transmission used for delay sensitive PS traffic such as conversational (e.g. VoIP) or signaling traffic, which in the following is also accounted as DCH traffic.

Some RTWP is caused by the E-DCH serving users. The E-DCH scheduler controls this portion by sending dedicated relative scheduling grants, absolute scheduling grants or both to each affected user, individually. Scheduled E-DCH transmission is used for PS traffic, which at a certain degree can tolerate some transmission delay (e.g. best effort traffic such as interactive/background service or guaranteed bit rate traffic such as streaming service). Another portion of the RTWP is caused by the E-DCH non-serving users. The E-DCH scheduler controls this portion by sending common relative scheduling grants to all or a group of affected users.

The E-DCH scheduler allocates the E-DCH portion of RTWP according to the following principles. First, the scheduler keeps the sum of all portions of RTWP within the limit that is given by a target RTWP limit. This target is signaled from the RNC to the NodeB. Secondly, the ratio of power received from non-serving E-DCH users to total received E-DCH power is kept at a certain level, which is also signaled from the RNC. Finally, only resources that have been leftover from the other users can be taken for scheduled E-DCH users.

The RTWP which is not controlled by the E-DCH scheduler is controlled by overload control algorithms located in the RNC. Call admission control (CAC) is used to limit this portion. For example, a new service request on DCH is admitted if this portion is below a selected threshold and rejected otherwise. Up to the UMTS 3GPP standards release 6, no new measurement other than RTWP has been defined and hence an admission control algorithm in the RNC must still apply its load control threshold on RTWP measurement.

There are several drawbacks to the existing solution. Given a sufficient traffic volume for E-DCH, the scheduler will try to allocate all remaining resource that has been leftover from the uplink users not under its control and the total RTWP will always be around the limit. In fact, load control will not work efficiently especially for high data rates on DCH. If an admission threshold for admission control is set around the target RTWP in order to overcome the problem mentioned above, there is the risk that the E-DCH scheduler reduces all E-DCH users down to zero before any load control action is taken when the traffic from users not under its control (e.g. R99 DCH users) increases.

The problems mentioned above already have been recognized by 3GPP and there were various attempts to solve the issue for the 3GPP UMTS standards release 7. The solutions presented so far are based on the measurement of some of the individual RTWP portions. However, there are still major drawbacks. In one proposed solution, which uses the measurement of RTWP not caused by E-DCH scheduled traffic, in order to reserve a certain amount of uplink resources to E-DCH, the relevant admission threshold must be set to relatively low values. This may lead to significant under-utilization of the resources by DCH users in case E-DCH is inactive in the specific cell. In another proposed solution, which uses the measurement of RTWP only caused by serving E-DCH traffic, new DCH service requests would be rejected when no E-DCH user is active. Therefore, the threshold has to be changed specifically for the case of inactive E-DCH.

In principle, one can think about using one set of thresholds for the case of inactive E-DCH and another set of thresholds for the case of active E-DCH. But for this method an indicator is needed for E-DCH activity in the specific cell. While in the NodeB this is relatively easy to achieve, in the RNC this is more difficult. There is no existing way for an E-DCH activity indicator to be sent from the NodeB to the RNC. Moreover, a special transition method is needed for the case when E-DCH users become active in the cell, following a scenario in which only DCH users were active.

It would be desirable to provide an improved method for allocating resources and serving E-DCH traffic.

SUMMARY

An exemplary method of controlling communications that may include enhanced dedicated channel (E-DCH) traffic includes setting a total uplink power limit below an allowable power limit. A minimum amount of uplink resources is allocated to each user requesting E-DCH service in an amount that establishes a cumulative minimum E-DCH power that satisfies a selected threshold minimum amount. A determination whether to admit a new non-E-DCH user is made based upon a relationship between a current total uplink power and the total uplink power limit and a relationship between a current cumulative E-DCH power and the selected threshold minimum amount.

The various features and advantages of this invention will become apparent to those skilled in the art from the following detailed description. The drawings that accompany the detailed description can be briefly described as follows.

BRIEF DESCRIPTION OF THE DRAWINGS

FIGS. 3A-3C schematically illustrate different traffic load scenarios.

DETAILED DESCRIPTION

Figure 1:
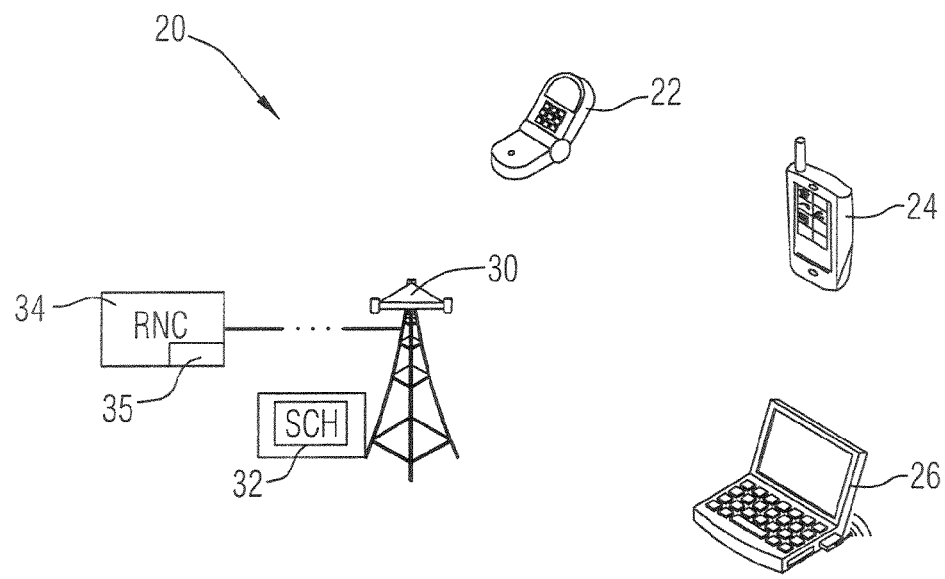
FIG. 1 schematically illustrates selected portions of an example communication system that is useful with an embodiment of this invention.

FIG. 1 schematically shows selected portions of a wireless communication system 20. A plurality of mobile stations 22, 24 and 26 are useful for voice communications, data communications or both. A base station 30 communicates with the mobile stations 22-26 to provide the desired service requested by a user. The base station 30 is capable of providing enhance dedicated channel (E-DCH) services to the example mobile stations.

The base station 30 includes a scheduler 32 that is useful for scheduling users for E-DCH service. The base station 30 also communicates with a radio network controller (RNC) 34. The base station scheduler 32 and the RNC 34 operate in a manner that facilitates scheduling dedicated channel (DCH) data traffic and E-DCH traffic. The illustrated RNC 34 includes a call admission control entity 35 that handles scheduling non-E-DCH traffic.

Figure 2:
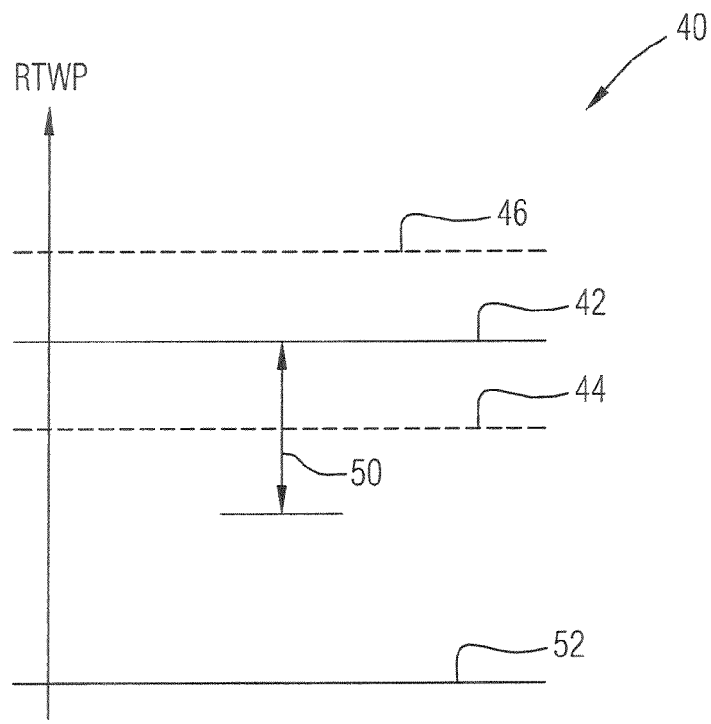
FIG. 2 schematically shows one example power resource allocation technique.

FIG. 2 schematically shows an example transmission power control strategy that is useful for managing uplink power levels and serving E-DCH users. A plot 40 shows uplink power as RTWP on the vertical axis. Various limits are applied, which are provided by the RNC 34 in one example by NBAP signaling to the base station scheduler 32. The parameters set in the RNC 34 generate associated measurement events and trigger the corresponding action responsive to a measurement event.

An allowable uplink power limit 42 corresponds to an acceptable amount of RTWP that avoids overload and provides desired coverage, for example. A total uplink power limit 44 is set to keep the actual RTWP on average below the allowable uplink power limit 42. The total uplink power limit 44 determines the limit of average DCH resource utilization when no E-DCH users are active in the cell. In this example, the total uplink power limit 44 provides an indicator that E-DCH is active in the specific cell and the E-DCH scheduler 32 is able to allocate all remaining uplink resources up to the limit 42.

A congestion control limit 46 is set to facilitate bringing the total RTWP back below the allowable uplink power limit 42 in the event that the total RTWP exceeds the latter. The congestion limit 46 is greater than the allowable uplink power limit 42. The example setting of the limit 46 ensures that congestion control will only reduce the DCH traffic, when the E-DCH scheduler 32 is unable to maintain the total uplink power below the limit 42. Setting the limit 46 in this way will allow a hysteresis because congestion control is not triggered responsive to every short-time overshot but only responsive to long term uplink overload, for example. In one example, the congestion control limit 46 is set relatively close to the allowable power limit 44 so that congestion control will reduce the RTWP well below the limit 44 with high probability.

In this example a minimum guaranteed resource allocation 50 is used by the scheduler 32 for E-DCH users. The minimum resource allocation 50 determines the limit of average E-DCH resource utilization when E-DCH users are active in the cell. Setting the value or range of the minimum allocation 50 allows for determining the priority of resource assignment to E-DCH users. Setting the minimum allocation 50 relatively high will reserve more uplink resources for E-DCH, while fewer resources will be available for DCH and vice versa.

The resource allocation 50 in one example is for those E-DCH users scheduled by the scheduler 32 and can be referred to as the minimum serving E-DCH power allocation. In another example, the resource allocation 50 is for those E-DCH users that are not controlled by the scheduler 32 and can be considered the minimum non-serving E-DCH power allocation. For discussion purposes, the remainder of this description will focus on the minimum serving E-DCH power allocation as an example. Those skilled in the art who have the benefit of this description will realize how to apply the principles of the discussed example to an implementation that includes a non-serving E-DCH power allocation as the minimum allocation 50.

The minimum serving E-DCH resource allocation is accomplished in one example by assigning a minimum amount of uplink resources to each user (e.g., mobile station), which is adjusted to support a minimum data rate of the active E-DCH users. Using an individual user limit approach allows for achieving a cumulative minimum power allocation to scheduled E-DCH users. The minimum allocation 50 setting in such an example also depends on the setting for the average minimum serving E-DCH power, which is given from the users' minimum scheduling grants together with their traffic activity. The scheduler 32 knows how many serving E-DCH users are scheduled and the granted resource allocation for each. The scheduler 32, in one example, manages the individual scheduling grants to utilize the minimum serving E-DCH power allocation whenever there is scheduled E-DCH traffic.

The serving E-DCH power and the non-serving E-DCH power together yield the total E-DCH resource consumption. In one example, a non-serving to total E-DCH power ratio provided by the RNC 34 determines the relative uplink resource portion for the non-serving E-DCH users. The scheduler knows the serving E-DCH power and the ratio and, therefore can determine the total.

The illustration shows a background noise level 52 that is estimated in the RNC from RTWP measurements during the time of low or no uplink activity, for example. The limits 44 and 46 may be determined from uplink load settings relative to the background noise level 52 or as pure RTWP values.

In one example, it is possible for the total current RTWP to exceed an allowable total RTWP limit 42 when DCH traffic is high and the E-DCH scheduler 32 has allocated a minimum scheduling grant to each E-DCH user sufficient to bring the total RTWP over the limit 42. The total E-DCH resource usage is determined by the uplink power of the active scheduled E-DCH users and the non-serving E-DCH users. In one example, the non-serving E-DCH power is determined from the current serving E-DCH power and the non-serving to total E-DCH power ratio provided by and adjusted by the RNC.

The congestion control limit 46 is applied whenever the total RTWP exceeds that limit. In one example, the congestion control includes reducing DCH user traffic. One example includes reducing the data rate of a selected number of PS users over DCH. Another example includes handover of some DCH calls to a separate frequency or to GSM. Other techniques for reducing DCH traffic may be applied.

For the purpose of admission control, at least the total uplink power limit 44 and the minimum E-DCH power allocation 50 are applied. In one example, the admission control includes performing load checks against both thresholds when deciding whether to admit or reject a service request on DCH. An example admission algorithm includes several decision criteria.

If the current total RTWP is less than the total uplink power limit 44, any service request for a user on DCH can be admitted regardless of the status of the current serving E-DCH power level. In this case E-DCH is not active or the E-DCH scheduler 32 does not allocate all available uplink resources to E-DCH (e.g., there is low E-DCH traffic). Then, there are sufficient resources available for the new DCH user with low risk that the RTWP will exceed the allowable uplink power limit 42.

If the current total RTWP is at least equal to the total uplink power limit 44 and the current serving E-DCH power is at least equal to the minimum serving E-DCH power allocation 50, a new service request for a user on DCH can be admitted. In this case E-DCH is active and the E-DCH scheduler 32 allocates all available uplink resources to E-DCH. The scheduler 32 uses more serving E-DCH power than the amount provided by the minimum serving E-DCH power allocation 50. In this case, there is still sufficient uplink resource available for the new DCH user with low risk that the total transmit power exceeds the allowable RTWP limit.

If the current total RTWP is at least equal to the total uplink power limit 44 and the current serving E-DCH power is less than the minimum serving E-DCH power allocation 50, a new service request for a user on DCH must be rejected. In this case, E-DCH is active and the E-DCH scheduler 32 allocates all available resources to E-DCH. The available resource for E-DCH, however, is close to the minimum allocation 50. Therefore, no resources are available for new DCH users without the risk of the total RTWP exceeding the allowable uplink power limit or the scheduler 32 reducing an actual serving E-DCH power to a level where sufficient E-DCH service cannot be provided anymore.

In one example, a user that is rejected repeats an attempt for service with a reduced data rate or an allocation to another carrier frequency, for example.

If a newly admitted service leads to an overload situation (e.g., when the admission thresholds were set too high), RTWP can exceed the total uplink power limit 44. If the current total RTWP exceeds the congestion control limit 46, the RNC congestion control will reduce DCH traffic as mentioned above. Accordingly, the limit 46 prevents uplink overload in case of aggressive admission control settings (e.g., the limit 44 and the threshold minimum 50).

FIG. 3a illustrates an example power allocation before any E-DCH traffic becomes active in the presence of some basic DCH load. The total RTWP in FIG. 3a comprises the background noise 60 and the DCH user power 62, which together yield a current total RTWP 64. In this example, the total RTWP 64 is below the total uplink power limit 44. New DCH service requests are granted provided that the total RTWP 64 stays below the total uplink power limit 44. If the limit 44 is reasonably set, there is only a low probability that the total RTWP will go above the allowable uplink power limit 42.

FIG. 3b schematically shows a scenario when E-DCH calls are starting. Some non-serving E-DCH users consume some of the available uplink resource represented at 66. In this example, the E-DCH scheduler 32 allocates a certain amount of the total transmit power at 68 to E-DCH users on an individual user basis. According to the example parameter setting, the scheduler 32 will allocate at least the minimum serving E-DCH power allocation 50 to scheduled E-DCH users. In this example, the current RTWP 64 was already large from usage of DCH. The newly active E-DCH traffic yields a total RTWP 70 that exceeds the allowable uplink power limit 42. In FIG. 3b, the system is in uplink overload and the total RTWP 70 must be reduced.

In the example of FIG. 3b, the total RTWP 70 also exceeds the congestion control limit 46. Accordingly, the congestion control of the RNC 34 will reduce the DCH traffic to reduce the total RTWP. One example includes reducing the data rate of some selected DCH users.

FIG. 3c shows a scenario that exists some time after the congestion control was implemented in response to the situation depicted in FIG. 3b. Here, the DCH traffic power 62' has been reduced and there is a sufficient portion of the allowable RTWP available for E-DCH traffic. In the illustrated example, the E-DCH scheduler 32 allocates more of the uplink resource to scheduled E-DCH users than the minimum serving E-DCH power allocation 50. The E-DCH scheduler can now constrain the total uplink power 74 below the allowable uplink power limit 42 and the system is no longer in uplink overload.

In FIG. 3c, the minimum serving E-DCH power allocation 50 threshold is applied in conjunction with the total uplink power limit 44. The use of those two thresholds and the admission control approach described above can keep the current serving E-DCH power 68' on average above the minimum threshold 50. The total consumed E-DCH resources (e.g., the sum of serving 68' and non-serving 66' E-DCH resources) is also limited due to the non-serving to total E-DCH power ratio, which the scheduler 32 applies.

There are several advantages associated with the disclosed example. One advantage stems from the use of individual minimum scheduling grants for E-DCH users. In a technique that only applies an overall minimum E-DCH scheduling grant, there are several problems, which are avoided with the minimum allocation per user approach of the disclosed example embodiment of this invention. For example, the disclosed example is not as sensitive to the fluctuations in RTWP, which are much higher than the changes in the UE transmit power. There are a lot of sources, which are not under control of the E-DCH scheduler, such as fluctuating background noise, other UMTS users not in soft handover, etc. With the minimum allocation per user approach, it is easier for the scheduler to provide a guaranteed minimum serving E-DCH power. Without the per user minimum allocation technique, it is difficult for the scheduler to preserve a specific constraint on the total received power due to signaling latency. Additionally, inactivity of the UEs can result in the real serving E-DCH power being below the overall minimum serving E-DCH power allocation.

Another advantage associated with the disclosed example is that the priority of the E-DCH traffic may be selectively set higher or lower than non-E-DCH traffic. DCH user data rates can, for example, be downgraded to guarantee a minimum data rate for E-DCH users. Additionally, setting the minimum E-DCH power allocation together with a minimum E-DCH data rate allows for adjusting the priorities of the uplink resource allocation.

The disclosed example does not require a separate indicator of E-DCH activity of the cell. The determination in one example is derived from the RTWP measurements and the serving E-DCH power measurements.

Better resource utilization is possible. For example, DCH traffic can reach a higher threshold and E-DCH traffic can utilize all unused throughput compared to a fixed allocation case.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of controlling communications that may include enhanced dedicated channel (E-DCH) traffic, comprising the steps of:
    setting a total uplink power limit below an allowable power limit;
    allocating a minimum power to each E-DCH user on an individual user basis such that a cumulative allocated E-DCH power satisfies a selected minimum E-DCH power threshold; and
    determining whether to grant a non-E-DCH service request based on a relationship between a current total uplink power and the total uplink power limit and a relationship between a current cumulative allocated E-DCH power and the selected minimum E-DCH power threshold.

2. The method of claim 1, wherein the selected minimum E-DCH power threshold comprises at least one of
    a minimum serving E-DCH power allocation; or
    a minimum non-serving E-DCH power allocation.

3. The method of claim 1, comprising
    determining a total E-DCH resource usage from an uplink power of the active serving E-DCH users and a non-serving to total E-DCH power ratio.

4. The method of claim 1, comprising
    determining a current E-DCH activity from a determined received total wideband power measurement and a serving E-DCH power measurement.

5. The method of claim 1, comprising
    setting the minimum E-DCH power allocation to achieve a desired priority for E-DCH traffic.

6. The method of claim 5, comprising
    setting the desired priority of E-DCH traffic higher than a priority for non-E-DCH traffic.

7. The method of claim 1, comprising
    determining whether a current total uplink power is less than the total uplink power limit; and
    granting a service request for a non-E-DCH user if the current total uplink power is less than the total uplink power limit.

8. The method of claim 1, comprising
    determining whether a current total uplink power is at least equal to the total uplink power limit;
    determining whether a current E-DCH power is at least equal to the minimum E-DCH power threshold; and
    granting a service request for a non-E-DCH user if the current total uplink power is at least equal to the total uplink power limit and the current E-DCH power is at least equal to the minimum E-DCH power threshold.

9. The method of claim 1, comprising
    determining whether a current total uplink power is at least equal to the total uplink power limit;
    determining whether a current E-DCH power is less than the minimum E-DCH power threshold; and
    denying a service request for a non-E-DCH user if the current total uplink power is at least equal to the total uplink power limit and the current E-DCH power is less than the minimum E-DCH power threshold.

10. The method of claim 1, wherein the uplink power is a received total wideband power.

11. The method of claim 1, comprising
    allocating an amount of uplink resources to E-DCH users that exceeds the minimum E-DCH power allocation.

12. The method of claim 11, comprising
    allocating an amount of uplink resources to E-DCH users that is approximately equal to any available uplink resource amount between a currently occupied amount and the allowable uplink power limit.

13. The method of claim 1, comprising
    setting a congestion control limit higher than the allowable uplink power limit; and
    reducing an uplink resource allocation to non-E-DCH users if there is E-DCH traffic and a current total uplink power exceeds the congestion control limit.

14. The method of claim 1, wherein the total uplink power limit is a limit for a received total wideband power at a base station and the minimum E-DCH power threshold corresponds to an amount of resources reserved for E-DCH users.

* * * * *